(12) United States Patent
Mattsson et al.

(10) Patent No.: US 11,739,816 B2
(45) Date of Patent: Aug. 29, 2023

(54) TRANSMISSION ARRANGEMENT

(71) Applicant: VOLVO CONSTRUCTION EQUIPMENT AB, Eskilstuna (SE)

(72) Inventors: Per Mattsson, Sölvesborg (SE); Mathias Lehikoinen, Västerås (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/719,783

(22) Filed: Apr. 13, 2022

(65) Prior Publication Data

US 2022/0333670 A1 Oct. 20, 2022

(30) Foreign Application Priority Data

Apr. 16, 2021 (EP) ..................................... 21168775

(51) Int. Cl.
 *F16H 3/64* (2006.01)
(52) U.S. Cl.
 CPC ....... *F16H 3/64* (2013.01); *F16H 2200/2007* (2013.01); *F16H 2200/2035* (2013.01)
(58) Field of Classification Search
 CPC ..... B60K 17/046; B60K 17/16; F16H 37/082; F16D 65/18
 See application file for complete search history.

(56) References Cited

U.S. PATENT DOCUMENTS

| | | | |
|---|---|---|---|
| 3,701,293 A | 10/1972 | Mori et al. | |
| 3,941,013 A | 3/1976 | Miller | |
| 4,205,563 A | 6/1980 | Gorrell | |
| 4,702,125 A | 10/1987 | Kalns | |
| 5,509,860 A | 4/1996 | Legner | |
| 9,221,335 B2 * | 12/2015 | Wirth | F16H 3/66 |
| 9,695,896 B2 * | 7/2017 | Brandemuehl | B60K 1/02 |
| 10,480,622 B2 * | 11/2019 | Kim | B60K 7/0007 |
| 2004/0048710 A1 | 3/2004 | Tumback | |
| 2009/0186734 A1 | 7/2009 | Perkins | |
| 2010/0069195 A1 | 3/2010 | Baldwin | |
| 2013/0066529 A1 | 3/2013 | Murayama | |
| 2018/0216709 A1 | 8/2018 | Kim et al. | |

(Continued)

FOREIGN PATENT DOCUMENTS

| | | |
|---|---|---|
| CN | 107878171 A | 4/2018 |
| DE | 102017006262 A1 | 1/2019 |
| DE | 102018210897 A1 | 1/2020 |

(Continued)

OTHER PUBLICATIONS

Extended European Search Report, European Patent Application No. 21168772.8, dated Jul. 22, 2021, 7 pages.

(Continued)

*Primary Examiner* — Derek D Knight
(74) *Attorney, Agent, or Firm* — Sage Patent Group

(57) ABSTRACT

A transmission arrangement includes a transmission housing including a transmission housing wall assembly defining a transmission housing cavity enclosing at least a first and a second planetary gear set, wherein at least an external portion of each one of a first and second locking mechanisms of the planetary gear sets is located on one side of the transmission housing wall assembly and the transmission housing cavity is located on an opposite side of the transmission housing wall assembly.

15 Claims, 5 Drawing Sheets

(56) References Cited

U.S. PATENT DOCUMENTS

2019/0113109 A1    4/2019  Mordukhovich et al.
2022/0389989 A1*  12/2022  Mattsson .................. F16H 3/48

FOREIGN PATENT DOCUMENTS

| DE | 102019119947 A1 | 1/2021 |
| DE | 102019119952 A1 | 1/2021 |
| EP | 3266635 B1 | 12/2018 |
| JP | 2007131107 A | 5/2007 |
| SE | 522675 C2 | 2/2004 |
| WO | WO 2020/105635 A1 | 5/2020 |
| WO | 2020184774 A1 | 9/2020 |

OTHER PUBLICATIONS

Extended European Search Report, European Patent Application No. 21168775.1, dated Jul. 26, 2021, 7 pages.
Extended European Search Report, European Patent Application No. 21168774.4, dated Oct. 11, 2021, 8 pages.
Extended European Search Report for EP Patent Application No. 22164983.3, dated Jul. 26, 2022, 5 pages.

* cited by examiner

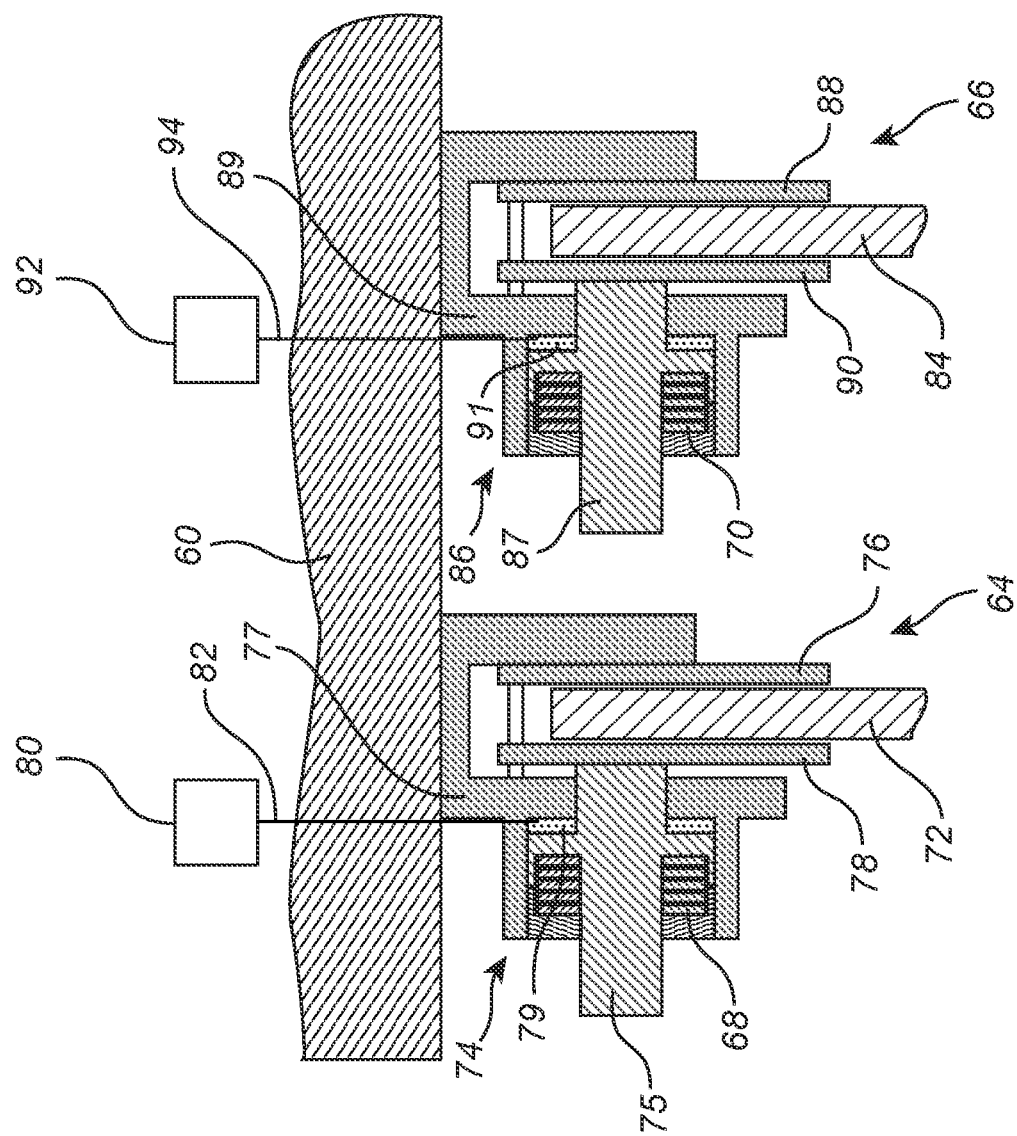

TRANSMISSION ARRANGEMENT

CROSS REFERENCE TO RELATED APPLICATIONS

This application claims foreign priority to European Patent Application No. 21168775.1, filed on Apr. 16, 2021, the disclosure and content of which is incorporated by reference herein in its entirety.

TECHNICAL FIELD

The present invention relates to a transmission arrangement. The invention also relates to a working machine comprising such a transmission arrangement. The invention is applicable on working machines within the fields of industrial construction machines or construction equipment, in particular articulated or rigid haulers. Although the invention will be described with respect to a rigid hauler, the invention is not restricted to this particular machine, but may also be used in other working machines such as wheel loaders, excavators, and backhoe loaders.

BACKGROUND

In connection with transportation of heavy loads at construction sites or the like, a working machine is often used. The working machines may be utilized for transportations in connection with road or tunnel building, sand pits, mines, forestry, and similar environments, and are often provided in the form of an articulated hauler or a rigid hauler.

Recently, not only cars are using electric machines as prime mover(s) for propulsion, also working machines are striving to use such more environmentally friendly prime mover. However, within the rough terrain at which the working machine is frequently operated, it is required that the vehicle is able to operate in a desired manner, and high quality of the vehicle gearbox is necessary.

Conventionally, the gearbox is arranged for adjusting the speed and strength of the vehicle in dependency of the specific driving scenario. The gearbox comprises a transmission arrangement and depending on the specific type of gearbox, the transmission arrangement may comprise e.g. gear wheels in meshed connection with each other or planetary gear sets comprising a respective sun gear, ring gear and a planet carrier, or a transmission arrangement having a combination of gear wheels in meshed connection and one or more planetary gear sets.

Due to the difference in speed range of an electric machine compared to a conventional internal combustion engine (ICE), the operational demands for a gearbox of an electrically propelled vehicle differs from an ICE propelled vehicle. There is thus a desire to further improve the gearbox for a working machine.

SUMMARY

It is an object of the present disclosure to provide a transmission arrangement that at least partially overcomes the above described deficiencies. This is achieved by a transmission arrangement according to claim 1.

According to a first aspect of the present invention, there is provided a transmission arrangement, comprising a first planetary gear set comprising a first set of planetary members, the first set of planetary members comprising a first sun gear, a first ring gear and a first planet carrier carrying a first set of planet gears, the first set of planet gears being in meshing engagement with the first ring gear and the first sun gear, a second planetary gear set comprising a second set of planetary members, the second set of planetary members comprising a second sun gear, a second ring gear and a second planet carrier carrying a second set of planet gears, the second set of planet gears being in meshing engagement with the second ring gear and the second sun gear, wherein a first member of the first set of planetary members is operatively connected to a first member of the second set of planetary members, and wherein a second member of the first set of planetary members is operatively connected to a second member of the second set of planetary members, a transmission housing, an input shaft connectable to a prime mover, the input shaft being operatively connected to the first sun gear, an output shaft operatively connected to the first planet carrier, and a gear selection arrangement comprising a first locking mechanism connected to one of the members of the first set of planetary members, the first locking mechanism being adapted to be controlled by a first fluid pressure conducted to the first locking mechanism such that for at least a first fluid pressure equal to zero overpressure, the first locking mechanism is adapted to assume a locked condition in which the one member of the first set of planetary members is locked to the transmission housing, and a second locking mechanism connected to one of the members of the second set of planetary members, the second locking mechanism being adapted to be controlled by a second fluid pressure conducted to the second locking mechanism such that for at least a second fluid pressure equal to zero overpressure, the second locking mechanism is adapted to assume a locked condition in which the one member of the second set of planetary members is locked to the transmission housing, wherein the transmission housing comprises a transmission housing wall assembly defining a transmission housing cavity enclosing at least the first and second planetary gear sets, wherein at least an external portion of each one of the first and second locking mechanisms is located on one side of the transmission housing wall assembly and the transmission housing cavity is located on an opposite side of the transmission housing wall assembly.

The wording "operatively connected to" should in the following and throughout the entire description be interpreted such that the components thereof are fixedly connected to each other, i.e. the rotational speed of the components which are operatively connected to each other is the same. Hence, no connecting mechanism or the like is arranged between the components that are operatively connected to each other and they can therefore not be disengaged from one another. In a similar vein, the wording "connected to" should be construed as components being either operatively connected to each other, or connected to each other via a transmission component, such as a gear wheel, or a clutch, etc.

By means of the above described transmission arrangement, a two-stage transmission is provided which is particularly advantageous for use in combination with a prime mover in the form of an electric machine. Thus, and according to an example embodiment, the prime mover may be an electric machine.

By means of the gear selection arrangement described above, the first and second locking mechanisms may be used in an energy efficient manner as a parking brake for instance. As such, in an embodiment in which a wheel or the like is connected to the transmission arrangement, the first and second locking mechanisms may be used for locking such a wheel. As such, when it is desired that e.g. the one of the members of the first set of planetary members be kept stationary for a certain amount of time, such a stationary condition may be achieved by simply reducing the first fluid pressure, possibly down towards or to zero overpressure. Thus, the one member of the first set of planetary members may be kept stationary without the need for operating a fluid pressure source, such as a pump. The same applies when keeping the one member of the second planetary members stationary.

Furthermore, the invention enables for at least a portion of each one of the first and second locking mechanisms can be kept outside, or on the outside of, the transmission housing. Such a position implies that e.g. repair and maintenance operations may be performed in a straightforward manner.

According to an example embodiment, the first locking mechanism may be further adapted to assume a set of first locking mechanism non-locked conditions in which the one member of the first set of planetary members is allowed to rotate relative to the transmission housing, and wherein the second locking mechanism may be further adapted to assume a set of second locking mechanism non-locked conditions in which the one member of the second set of planetary members is allowed to rotate relative to the transmission housing, whereby for a first fluid pressure equal to or higher than a first fluid pressure threshold, the first locking mechanism is adapted to assume a released condition in which the one member of the first set of planetary members is free to rotate relative to the transmission housing, the released condition forming part of the set of first locking mechanism non-locked conditions, for at least one first intermediate pressure between zero overpressure and the first fluid pressure threshold, the first locking mechanism is adapted to assume a slipping condition in which a relative rotation is allowed but braking torque is applied between the transmission housing and the one member of the first set of planetary members, the slipping condition forming part of the set of first locking mechanism non-locked conditions, for a second fluid pressure equal to or higher than a second fluid pressure threshold, the second locking mechanism is adapted to assume a released condition in which the one member of the second set of planetary members is free to rotate relative to the transmission housing, the released condition forming part of the set of second locking mechanism non-locked conditions, and for at least one second intermediate pressure between zero overpressure and the second fluid pressure threshold, the second locking mechanism is adapted to assume a slipping condition in which a relative rotation is allowed but braking torque is applied between the transmission housing and the one member of the second set of planetary members, the slipping condition forming part of the set of second locking mechanism non-locked conditions.

Hereby, the first and second locking mechanisms are allowed to be arranged in a slipping condition, which means that a relative rotation of the respective locking mechanism is allowed when applying a braking torque. An advantage is that a smooth transition between a fully locked and a fully released condition can be obtained.

According to an example embodiment, the gear selection arrangement may be adapted to assume a first gear condition in which the first locking mechanism assumes the locked condition and in which the second locking mechanism assumes one of the set of second locking mechanism non-locked conditions.

According to an example embodiment, the second locking mechanism may assume the slipping condition in the first gear condition. The second locking mechanism may hereby be used as a service brake.

According to an example embodiment, the gear selection arrangement may be adapted to assume a second gear condition in which the second locking mechanism assumes the locked condition and in which the first locking mechanism assumes one of the set of first locking mechanism non-locked conditions.

According to an example embodiment, the first locking mechanism may assume the slipping condition in the second gear condition. The first locking mechanism may hereby be used as a service brake.

According to an example embodiment, the gear selection arrangement may be adapted to assume a locked condition in which the first locking mechanism assumes the locked condition and the second locking mechanism assumes the locked condition. As indicated above, the first and second locking mechanisms may be used for locking a wheel, thereby forming a parking brake functionality for the vehicle to which the transmission arrangement is connected.

According to an example embodiment, the first locking mechanism may comprise a first biasing member, preferably a first spring arrangement, adapted to bias the first locking mechanism so as to assume the locked condition and the second locking mechanism may comprise a second biasing member, preferably a second spring arrangement, adapted to bias the second locking mechanism so as to assume the locked condition. The biasing members imply a cost and energy efficient implementation of the locking mechanisms in order to obtain the desired characteristics thereof.

According to an example embodiment, the first locking mechanism may comprise a first brake disc and a first brake caliper and the second locking mechanism may comprise a second brake disc and a second brake caliper. Using a brake disc and a brake caliper may be particularly advantageous for a locking mechanism used as a parking brake.

According to an example embodiment, the external portion of the first locking mechanism may comprise the first brake disc and the first brake caliper and the external portion of the second locking mechanism may comprise the second brake disc and the second brake caliper. Thus, the first brake disc and the first brake caliper as well as the second brake disc and the second brake caliper may be kept outside, or on the outside of, the transmission housing, which implies that e.g. repair and maintenance operations may be performed in a straightforward manner.

According to an example embodiment, the transmission housing cavity may comprise a transmission lubrication liquid, wherein at least the external portion of each one of the first and second locking mechanisms is adapted to be in non-contact with the transmission lubrication liquid. An advantage is that the locking mechanisms are kept dry.

According to an example embodiment, the first locking mechanism may be connected to the first ring gear. According to an example embodiment, the second locking mechanism may be connected to the second ring gear.

According to an example embodiment, the first ring gear may be operatively connected to the second planet carrier.

According to a second aspect, there is provided a working machine comprising a transmission arrangement according to any one of the embodiments described above in relation to the first aspect, and a prime mover connected to the input shaft of the transmission arrangement.

Effects and features of the second aspect of the present invention are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features, and advantages of the present invention, will be better understood through the following illustrative and non-limiting detailed description of exemplary embodiments of the present invention, wherein:

FIG. 4 illustrates a portion of the example embodiments depicted in FIGS. 3A-3B.

DETAIL DESCRIPTION

Figure 1:
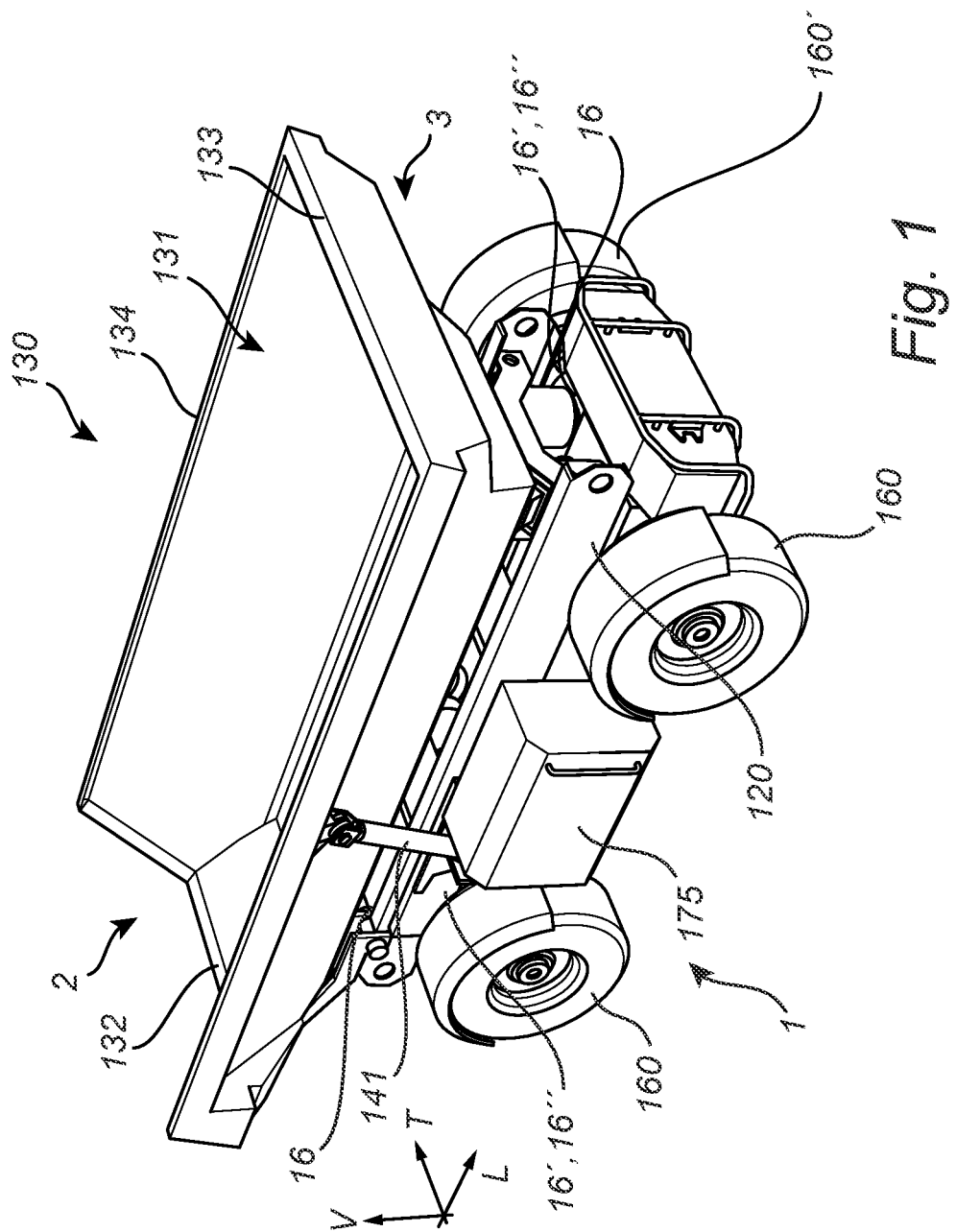
FIG. 1 is a perspective view of a working machine according to one embodiment.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

With reference to FIG. 1, a working machine 1 is according to an example embodiment depicted. The inventive concept is applicable on any working machines within the fields of industrial construction machines or construction equipment, in particular dumpers/haulers. Although the invention will be described with respect to a rigid hauler, the invention is not restricted to this particular machine, but may also be used in other working machines such as articulated haulers, excavators, backhoe loaders and wheel loaders.

As seen in FIG. 1 the working machine comprises a dump body 130 for accommodating a load. Merely as an example, and as is indicated in FIG. 1, the dump body 130 may be a loading platform of the working machine 1. The working machine 1 is adapted to have a load receiving condition in which the dump body 130 comprises an open load receiving area 131 outwardly delimited by a load receiving area circumference 134. Generally, the open load receiving area 131 may be an area that is directly accessible from the environment surrounding the working machine 1. For instance, the open load receiving area 131 may be an area that is directly accessible from the above of the dump body 130.

The working machine does not have a driver seat, but is intended to be autonomously and/or remotely driven. The machine further comprises a first side 3 and a second side 2 arranged opposite to the first side 3, the second side 2 being a load dumping side 2. The first side 3 may also be referred to as an opposite side 3. The opposite side 3 may be used as a front end side when the machine is driven in the direction that puts the opposite side 3 first. However, the working machine 1 may be drivable in any direction, i.e. it is bidirectional. Further, the dump body 130 comprises a load dumping end portion 132 arranged on the working machines load dumping side 2, and an opposite end portion 133 arranged on the working machines opposite side 3.

Further, still referring to FIG. 1 the working machine 1 comprises a working machine frame 120 to which a pair of propulsion axles 16 is mounted. Each propulsion axle 16 comprises, amongst other things, drive shafts 16', 16". The working machine frame 120 further supports the dump body 130, and thereby carries the load of anything contained in the dump body 130 as well as the weight from the dump body itself. The propulsion axles 16 are connected to ground engaging members 160, 160' for driving the ground engaging members 160, 160'. In FIG. 1 the ground engaging members 160, 160' are illustrated as wheels, however, they may also be crawlers.

Further, a prime mover, in the following referred to as an electric motor 36 (see FIG. 2) is installed onto the propulsion axle 16 and coupled to the drive shafts 16', 16". As will be evident from FIG. 2, the electric motor 36 is coupled to the drive shafts 16', 16" via a transmission arrangement 38. The working machine may comprise one electric motor 36 on each propulsion axle 16.

Still further, the working machine 1 may comprise a tilting arrangement, such as a tilting arrangement comprising one or more tilting actuators 141, such as hydraulic actuators, for tilting the dump body 130 of the working machine 1. The tilting arrangement is in one end attached to the frame 120 and in the other end to the dump body 130. Preferably, the tilting arrangement comprises two tilting actuators 141 arranged at different sides of the dump body to ensure a stable tilting (not shown).

FIG. 1 finally discloses an electrical control arrangement 175, arranged to the frame of the working machine 1. The electrical control arrangement 175 may comprise a power source (not shown) e.g. a battery arrangement, for supporting the electric motor 36 and any other components with power. Further, the electrical control arrangement 175 may comprise a control unit (not shown) for controlling the working machine. The control unit may be capable of receiving a remote control signal to enable the working machine to be remotely controlled. Such a signal may be received from an external transmitting unit (not shown). It may further be capable of communicating any information to or from the working machine from or to a remote server (not shown). Such information may comprise usage data, service information, battery status, load, weight, capacity utilization or any other relevant information.

The working machine is thus propelled by a powertrain 34 (see FIG. 2), including the electric motor 36 for propulsion of the working machine. In order to describe the powertrain in further detail, reference is therefore now made to FIG. 2, which is a schematic side view of a powertrain comprising a transmission arrangement according to an example embodiment. The FIG. 2 powertrain is exemplified as being adapted to propel the ground engaging members 160, 160' associated with the front propulsion axle 16. The propulsion axle 16 thus at least comprises the above described drive shafts 16', 16" arranged at the opposite side 3 of the vehicle 1. However, the FIG. 2 powertrain may be used for propelling any ground engaging member or members, for instance the ground engaging members associated with the drive shafts arranged at the dumping side 2 of the vehicle 1.

Figure 2:
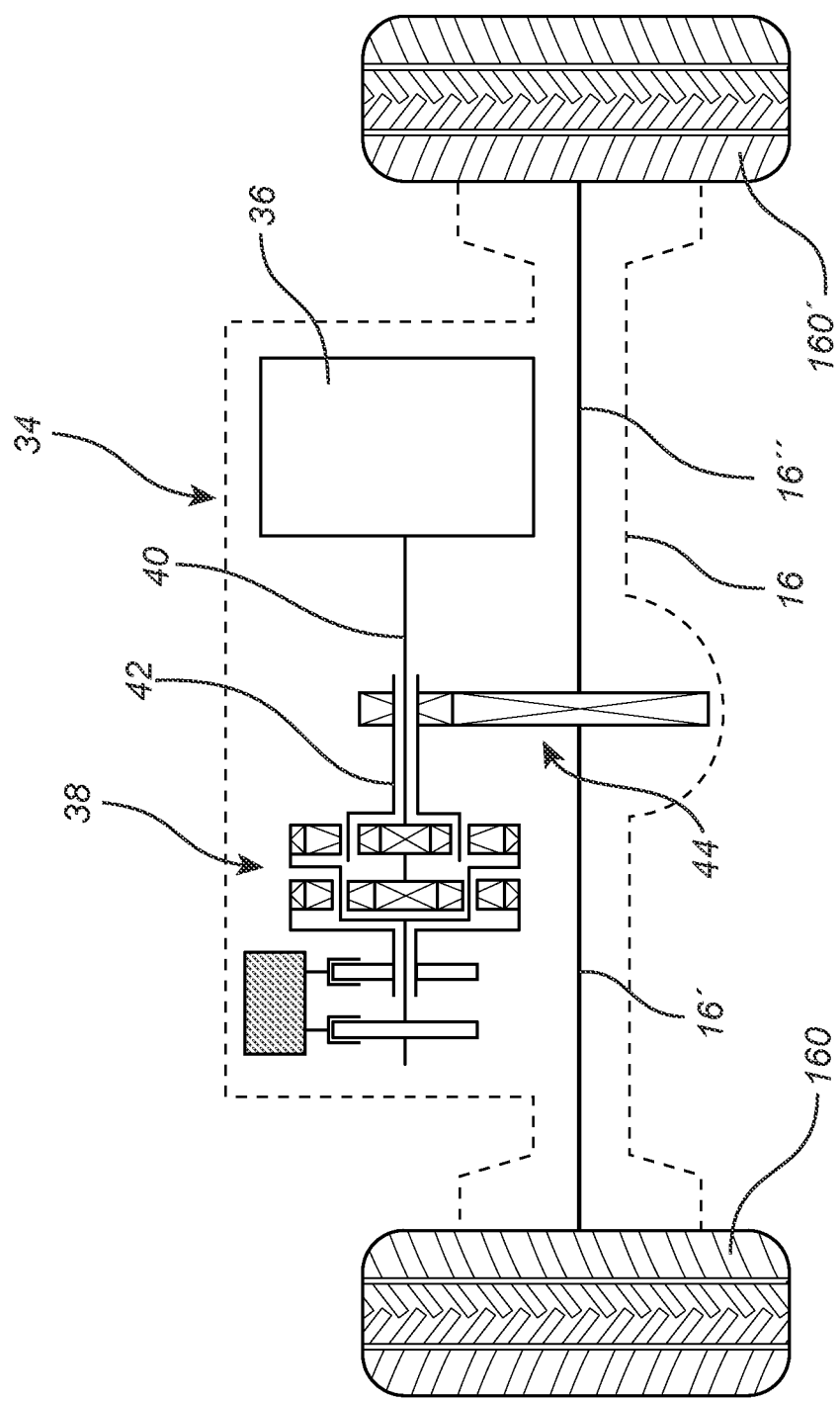
FIG. 2 is a schematic side view of a powertrain comprising a transmission arrangement according to an example embodiment.

Irrespective of the intended use, the FIG. 2 powertrain 34 comprises an electric motor 36, a set of ground engaging members 160, 160' and a transmission arrangement 38 comprising an input shaft 40 and an output shaft 42. The electric motor 36 is adapted to feed power to the input shaft 40 and the output shaft 42 is adapted to feed power to the set of ground engaging members 160, 160'.

Purely by way of example, and as indicated in FIG. 2, an output shaft of the electric motor 36 may be rotationally fixedly connected to the input shaft 40. However, it is also envisaged that the output shaft of the electric motor 36 may be connected to the input shaft 40 via one or more other components, such as one or more transmission components (not shown in FIG. 2).

Furthermore, the output shaft 42 may be connected to the set of ground engaging members 160, 160' via a gear set 44, such as a cylindrical gear set 44, and further via the drive shafts 16', 16" accommodated within and/or forming part of the previously described propulsion axle 16. However, it is also envisaged that the output shaft 42 may be connected to the set of ground engaging members 160, 160' in other ways. For instance, it is contemplated that embodiments of the powertrain 34 may comprise an output shaft 42 that is adapted to be connected to the set of ground engaging members 160, 160' using other or fewer intermediate components than what has been exemplified above with reference to FIG. 2. As a non-limiting example, it is envisaged that the output shaft 42 may be rotationally fixedly connected to a ground engaging member 160, 160'. For instance, it is contemplated that the powertrain 34 may form a hub motor assembly for a vehicle, such as a working machine.

Figure 3A:
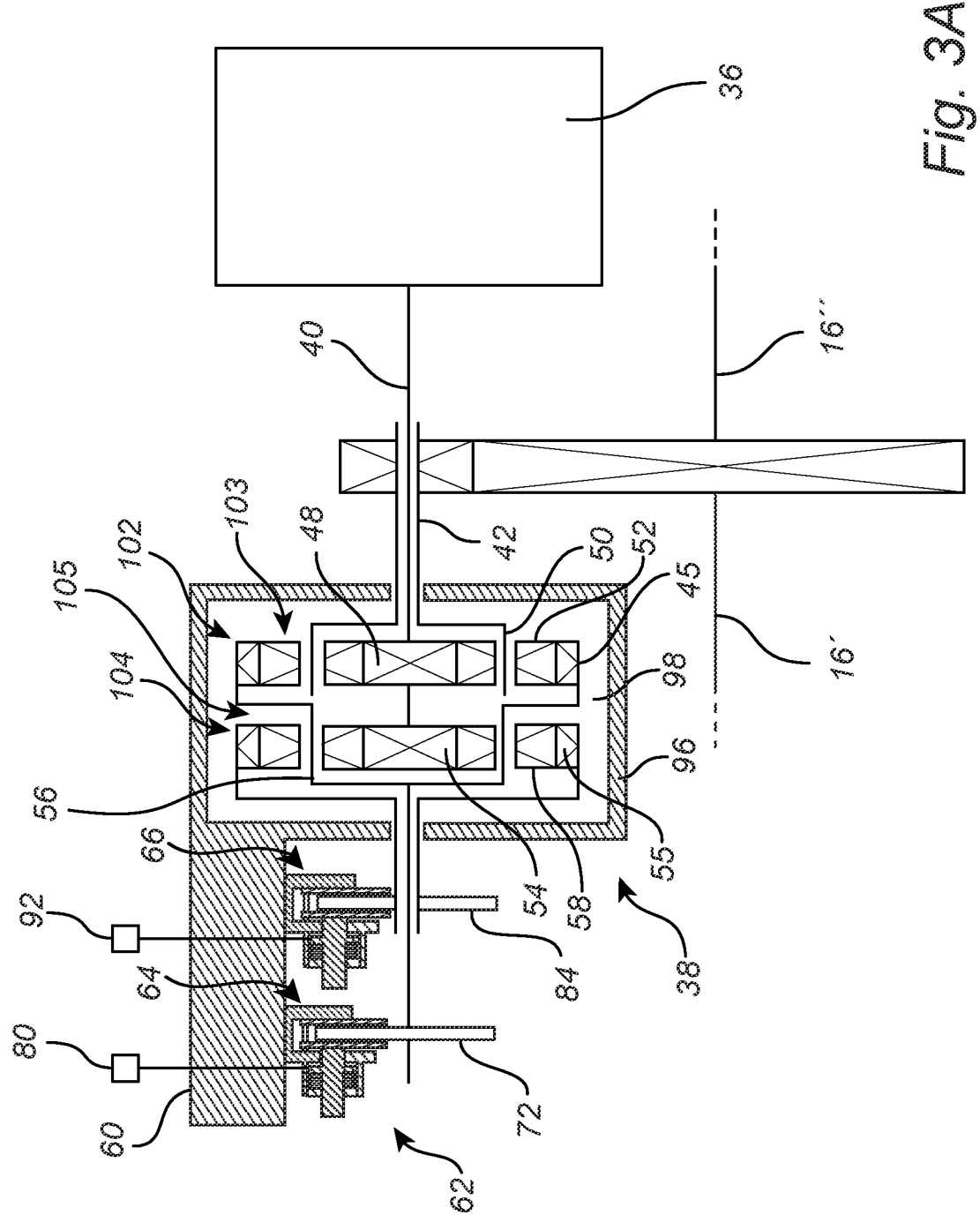
FIG. 3A is a schematic side view of a transmission arrangement according to an example embodiment.

In order to describe the transmission arrangement 38 in further detail, reference is made to FIG. 3A which is a schematic side view of a transmission arrangement according to an example embodiment. As can be seen, the transmission arrangement 38 comprises a first planetary gear set 102 and a second planetary gear set 104. The first planetary gear set 102 comprises a first set of planetary members 103, wherein the first set of planetary members 103 comprises a first sun gear 48, a first ring gear 45 and a first planet carrier 50 carrying a first set of planet gears 52. The first set of planet gears 52 are in meshing engagement with the first ring gear 45 and the first sun gear 48. The second planetary gear set 104 comprises a second set of planetary members 105. The second set of planetary members 105 comprises a second sun gear 54, a second ring gear 55 and a second planet carrier 56 carrying a second set of planet gears 58. The second set of planet gears 58 are in meshing engagement with the second ring gear 55 and the second sun gear 54. As can be seen in FIG. 3A, a first member of the first set of planetary members 103 is operatively connected to a first member of the second set of planetary members 105. Also, a second member of the first set of planetary members 103 is operatively connected to a second member of the second set of planetary members 105. According to the non-limiting example embodiment depicted in FIG. 3A, the first member of the first planetary members corresponds to the first sun gear 48 and the first member of the second planetary members corresponds to the second sun gear 54, which are operatively connected to each other. The second member of the first planetary members corresponds to the first ring gear 45, while the second member of the second planetary members corresponds to the second planet carrier 56, which are operatively connected to each other.

As is further illustrated in FIG. 3A, the input shaft 40 is operatively connected to the first sun gear 48, and the output shaft 42 is operatively connected to the first planet carrier 50. As can be further seen in FIG. 3A, the transmission arrangement 38 further comprises a transmission housing 60. The transmission arrangement 38 also comprises a gear selection arrangement 62. The gear selection arrangement 62 comprises a first locking mechanism 64 connected to one member of the first set of planetary members 103. In the example embodiment depicted in FIG. 3A, the first locking mechanism 64 is actually connected to a member of the first set of planetary members 103 as well as to a member of the second set of planetary members 105. According to the non-limiting example embodiment of FIG. 3A, the first locking mechanism 64 is connected to the first ring gear 45 as well as to the second planet carrier 56. For simplifying the reading of the present disclosure, the following description in relation to FIG. 3A will describe the first locking mechanism 64 as connected to the first ring gear 45 as well as to the second planet carrier 56. The first locking mechanism 64 is adapted to be controlled by a first fluid pressure conducted to the first locking mechanism 64 such that for at least a first fluid pressure equal to zero overpressure, the first locking mechanism 64 is adapted to assume a locked condition in which the first ring gear 45 and the second planet carrier 56 are locked to the transmission housing 60.

The gear selection arrangement 62 also comprises a second locking mechanism 66 connected to one member of the second set of planetary members 105. In the non-limiting example embodiment depicted in FIG. 3A, the second locking mechanism 66 is connected to the second ring gear 55. For simplifying the reading of the present disclosure, the following will describe the second locking mechanism 66 as connected to the second ring gear 55, which is also valid for the transmission arrangement described below with reference to FIG. 3B. The second locking mechanism 66 is adapted to be controlled by a second fluid pressure conducted to the second locking mechanism 66 such that for at least a second fluid pressure equal to zero overpressure, the second locking mechanism 66 is adapted to assume a locked condition in which the second ring gear 55 is locked to the transmission housing.

Furthermore, and purely by way of example, the implementation of the gear selection arrangement 62 is such that the first locking mechanism 64 is further adapted to assume a set of first locking mechanism non-locked conditions in which the first ring gear 45 and the second planet carrier 56 are allowed to rotate relative to the transmission housing 60, and wherein the second locking mechanism 66 is further adapted to assume a set of second locking mechanism non-locked conditions in which the second ring gear 55, is allowed to rotate relative to the transmission housing, whereby for a first fluid pressure equal to or higher than a first fluid pressure threshold, the first locking mechanism 64 is adapted to assume a released condition in which the first ring gear 45 and the second planet carrier 56 are free to rotate relative to the transmission housing 60, wherein the released condition is forming part of the set of first locking mechanism non-locked conditions. Also, for at least one first intermediate pressure between zero overpressure and the first fluid pressure threshold, the first locking mechanism 64 is adapted to assume a slipping condition in which a relative rotation is allowed but braking torque is applied between the transmission housing 60 and the first ring gear 45 as well as the second planet carrier 56, wherein the slipping condition is forming part of the set of first locking mechanism non-locked conditions. Moreover, for a second fluid pressure equal to or higher than a second fluid pressure threshold, the second locking mechanism 66 is adapted to assume a released condition in which the second ring gear 55 is free to rotate relative to the transmission housing 60, wherein the released condition is forming part of the set of second locking mechanism non-locked conditions. Also, for at least one second intermediate pressure between zero overpressure and the second fluid pressure threshold, the second locking mechanism 66 is adapted to assume a slipping condition in which a relative rotation is allowed but braking torque is applied between the transmission housing 60 and the second ring gear 55, wherein the slipping condition is forming part of the set of second locking mechanism non-locked conditions.

The first locking mechanism 64 may be implemented in a plurality of ways. Purely by way of example, the first locking mechanism 64 may be implemented as an on-off locking mechanism, such as a dog clutch, adapted to assume either a fully locked or a fully released condition. As such, though purely by way of example, the set of first locking mechanism non-locked conditions may contain only one non-locked condition, i.e. a fully released condition as exemplified above.

In a similar vein, the second locking mechanism 66 may be implemented in a plurality of ways. Purely by way of example, the second locking mechanism 66 may be implemented as an on-off locking mechanism, such as a dog clutch, adapted to assume either a fully locked or a fully released condition. As such, though purely by way of example, the set of second locking mechanism non-locked conditions may contain only one non-locked condition, i.e. a fully released condition as exemplified above.

Furthermore, each one of the first locking mechanism 64 and the second locking mechanism 66 may preferably be arranged as a parking brake. As such, each one of the first 64 and second 66 locking mechanisms may be implemented such that it assumes a locked condition at least when a fluid pressure conducted to the locking mechanism is equal to zero overpressure.

Figure 3B:
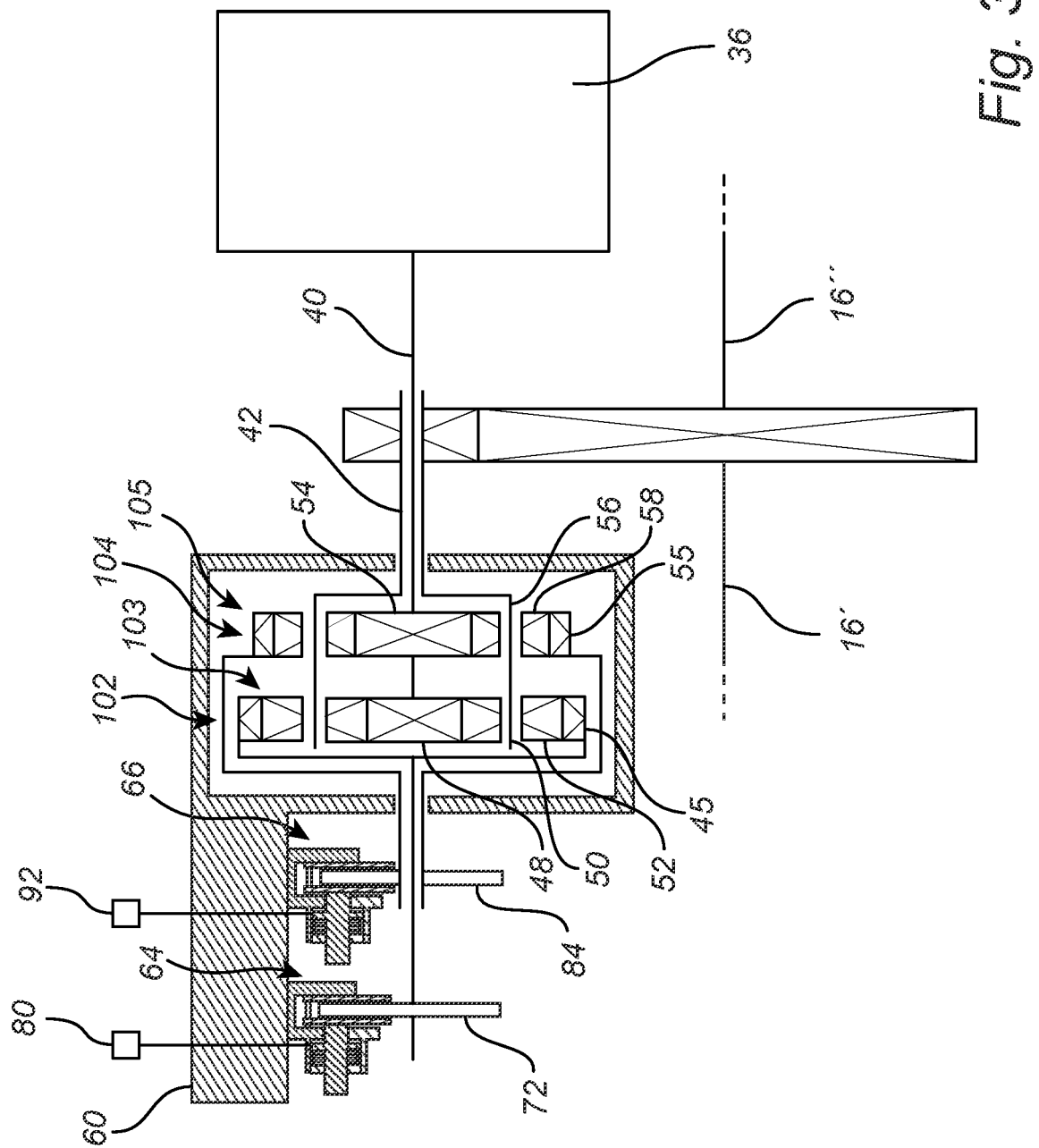
FIG. 3B is a schematic side view of a transmission arrangement according to another example embodiment.

In order to describe the transmission arrangement according to another example embodiment, reference is now made to FIG. 3B. The FIG. 3B example embodiment differs from the FIG. 3A example embodiment mainly as to how the planetary members are connected to each other.

In a similar vein as the transmission arrangement depicted in FIG. 3A, the FIG. 3B transmission arrangement 38 comprises a first planetary gear set 102 and a second planetary gear set 104. The first planetary gear set 102 comprises a first set of planetary members 103, wherein the first set of planetary members 103 comprises a first sun gear 48, a first ring gear 45 and a first planet carrier 50 carrying a first set of planet gears 52. The first set of planet gears 52 are in meshing engagement with the first ring gear 45 and the first sun gear 48. The second planetary gear set 104 comprises a second set of planetary members 105. The second set of planetary members 105 comprises a second sun gear 54, a second ring gear 55 and a second planet carrier 56 carrying a second set of planet gears 58. The second set of planet gears 58 are in meshing engagement with the second ring gear 55 and the second sun gear 54.

As can be seen in FIG. 3B, a first member of the first set of planetary members 103 is operatively connected to a first member of the second set of planetary members 105. Also, a second member of the first set of planetary members 103 is operatively connected to a second member of the second set of planetary members 105. According to the non-limiting example embodiment depicted in FIG. 3B, the first member of the first planetary members corresponds to the first sun gear 48 and the first member of the second planetary members corresponds to the second sun gear 54, which are operatively connected to each other. The second member of the first planetary members corresponds to the first planet carrier 50, while the second member of the second planetary members corresponds to the second planet carrier 56, which are operatively connected to each other. Accordingly, the first set of planet gears 52 and the second set of planet gears 58 share the same planet carrier 50, 56.

In a similar manner as for the embodiment depicted in FIG. 3A, and as is further illustrated in FIG. 3B, the input shaft 40 is operatively connected to the first sun gear 48, and the output shaft 42 is operatively connected to the first planet carrier 50. As can be further seen in FIG. 3B, the transmission arrangement 38 further comprises a transmission housing 60. The transmission arrangement 38 also comprises a gear selection arrangement 62. The gear selection arrangement 62 comprises a first locking mechanism 64 connected to one member of the first set of planetary members 103. In the example embodiment depicted in FIG. 3B, the first locking mechanism 64 is connected to the first ring gear 45. The first locking mechanism 64 is adapted to be controlled by a first fluid pressure conducted to the first locking mechanism 64 such that for at least a first fluid pressure equal to zero overpressure, the first locking mechanism 64 is adapted to assume a locked condition in which the first ring gear 45 is locked to the transmission housing 60.

The gear selection arrangement 62 also comprises a second locking mechanism 66 connected to one member of the second set of planetary members 105. In the non-limiting example embodiment depicted in FIG. 3B, the second locking mechanism 66 is connected to the second ring gear 55. The second locking mechanism 66 is adapted to be controlled by a second fluid pressure conducted to the second locking mechanism 66 such that for at least a second fluid pressure equal to zero overpressure, the second locking mechanism 66 is adapted to assume a locked condition in which the second ring gear 55 is locked to the transmission housing.

Furthermore, and purely by way of example, the implementation of the gear selection arrangement 62 is such that the first locking mechanism 64 is further adapted to assume a set of first locking mechanism non-locked conditions in which the first ring gear 45 is allowed to rotate relative to the transmission housing 60, and wherein the second locking mechanism 66 is further adapted to assume a set of second locking mechanism non-locked conditions in which the second ring gear 55, is allowed to rotate relative to the transmission housing, whereby for a first fluid pressure equal to or higher than a first fluid pressure threshold, the first locking mechanism 64 is adapted to assume a released condition in which the first ring gear 45 is free to rotate relative to the transmission housing 60, wherein the released condition is forming part of the set of first locking mechanism non-locked conditions. Also, for at least one first intermediate pressure between zero overpressure and the first fluid pressure threshold, the first locking mechanism 64 is adapted to assume a slipping condition in which a relative rotation is allowed but braking torque is applied between the transmission housing 60 and the first ring gear 45, wherein the slipping condition is forming part of the set of first locking mechanism non-locked conditions. Moreover, for a second fluid pressure equal to or higher than a second fluid pressure threshold, the second locking mechanism 66 is adapted to assume a released condition in which the second ring gear 55 is free to rotate relative to the transmission housing 60, wherein the released condition is forming part of the set of second locking mechanism non-locked conditions. Also, for at least one second intermediate pressure between zero overpressure and the second fluid pressure threshold, the second locking mechanism 66 is adapted to assume a slipping condition in which a relative rotation is allowed but braking torque is applied between the transmission housing 60 and the second ring gear 55, wherein the slipping condition is forming part of the set of second locking mechanism non-locked conditions.

In a similar vein as for the embodiment depicted in FIG. 3A, the first locking mechanism 64 may be implemented in a plurality of ways. Purely by way of example, the first locking mechanism 64 may be implemented as an on-off locking mechanism, such as a dog clutch, adapted to assume either a fully locked or a fully released condition. As such, though purely by way of example, the set of first locking mechanism non-locked conditions may contain only one non-locked condition, i.e. a fully released condition as exemplified above.

In a similar vein, the second locking mechanism 66 may be implemented in a plurality of ways. Purely by way of example, the second locking mechanism 66 may be implemented as an on-off locking mechanism, such as a dog clutch, adapted to assume either a fully locked or a fully released condition. As such, though purely by way of example, the set of second locking mechanism non-locked conditions may contain only one non-locked condition, i.e. a fully released condition as exemplified above.

Furthermore, each one of the first locking mechanism 64 and the second locking mechanism 66 may preferably be arranged as a parking brake. As such, each one of the first 64 and second 66 locking mechanisms may be implemented such that it assumes a locked condition at least when a fluid pressure conducted to the locking mechanism is equal to zero overpressure.

Implementations of the first 64 and second 66 locking mechanisms are hereinafter presented with reference to FIG. 4 which illustrates a portion of the example embodiments depicted in FIGS. 3A-3B. As may be gleaned from FIG. 4, the first locking mechanism 64 comprises a first biasing member 68, which first biasing member 68 is implemented as a first spring arrangement in FIG. 4, adapted to bias the first locking mechanism 64 so as to assume the locked condition and wherein the second locking mechanism 66 comprises a second biasing member 70, which second biasing member 70 is implemented as a second spring arrangement in FIG. 4, adapted to bias the second locking mechanism 66 so as to assume the locked condition.

In the FIG. 4 implementation, the first biasing member 68 is implemented as a disc spring, although other types of biasing members are also envisaged, such as a helical spring or the like. In a similar vein, in the FIG. 4 implementation, the second biasing member 70 is implemented as a disc spring, although other types of biasing members are also envisaged, such as a helical spring or the like.

In the FIG. 4 implementation, the first locking mechanism 64 comprises a first brake disc 72 and a first brake caliper 74. The first brake caliper 74 includes a first caliper body 77 that holds two brake pads 76, 78 located on opposite sides of the first brake disc 72. A first piston 75 is positioned within the first caliper body 77. The first piston 75 is biased in a direction towards the first brake disc 72 by means of the first biasing member 68 to thereby bias the brake pad 78 towards the first brake disc 72. Purely by way of example, in order to apply a braking torque to the first brake disc 72, the first brake caliper 74 may be fixedly connected to the transmission housing 60 in at least the direction of the needed reaction force.

Moreover, the FIG. 4 implementation of the first brake caliper 74 is a so called floating caliper. As such, the FIG. 4 implementation of the first brake caliper 74 can move with respect to the first brake disc 72, along a line parallel to the axis of rotation of the first brake disc 72. Thus, when the first biasing member 68 has pushed one of the brake pads 78, via the first piston 75, such that it makes contact with the first brake disc 72, the first caliper body 77 then slides and pulls the other brake pad 76 so that pressure is applied to both sides of the first brake disc 72.

However, it should be noted that other implementations are also envisaged. Purely by way of example, the implementations of the first locking mechanism 64 may comprise two biasing members (not shown), each one of which being adapted to bias an individual brake pad 76, 78 towards the first brake disc 72. As such, the first brake caliper 74 need not necessarily be a so called floating caliper.

The first brake caliper 74 is in turn connected to a first fluid source 80, for instance via a fluid conduit 82 as exemplified in FIG. 4. Purely by way of example, the first fluid source 80 may be a tank or a pump and the fluid may for instance be a gas, such as air, or a liquid, such as a hydraulic fluid, for instance hydraulic oil. In the FIG. 4 implementation, the first brake caliper 74 controls the two brake pads 76, 78 such that when the first brake caliper 74 is fed with fluid having a fluid pressure from the fluid source 80, the first brake caliper 74 releases the two brake pads 76, 78 from contact with the first brake disc 72.

In the FIG. 4 implementation of the first locking mechanism 64, the first fluid source 80 is fluidly connected to a first fluid cavity 79 formed between the first piston 75 and the first caliper body 77. As such, a fluid pressure applied in the first fluid cavity 79 will impart a force onto the first piston 75 in a direction opposite to the force generated by the first biasing member 68, thus forcing the two brake pads 76, 78 away from each other.

In the FIG. 4 implementation, the first biasing member 68 and the first fluid pressure applied in the first fluid cavity 79 interact such that for at least a first fluid pressure equal to zero overpressure, the first locking mechanism 64 is adapted to assume the above-mentioned locked condition. In such a condition, the biasing force from the first biasing member 68 exceeds the force by which the first fluid pressure releases the two brake pads 76, 78 from the first brake disc 72. It should also be noted that the first locking mechanism 64 may be adapted to assume the above-mentioned locked condition also when a first fluid pressure is greater than zero overpressure.

Furthermore, and with reference to the exemplified transmission arrangement in FIG. 3A, for a first fluid pressure equal to or higher than the first fluid pressure threshold, the first locking mechanism 64 is adapted to assume a released condition in which the first ring gear 45 and the second planet carrier 56 are free to rotate relative to the transmission housing 60. In such a condition, the biasing force from the first biasing member 68 does not exceed the force by which the first fluid pressure releases the two brake pads 76, 78 from the first brake disc 72 such that there is no contact between the first brake disc 72 and any one of the brake pads 76, 78.

Still further, again with reference to the exemplified transmission arrangement in FIG. 3A, for at least one first intermediate pressure between zero overpressure and the first fluid pressure threshold, the first locking mechanism 64 is adapted to assume a slipping condition in which a relative rotation is allowed but braking torque is applied between the transmission housing 60 and the first ring gear 45 as well as the second planet carrier 56. In a slipping condition, there is contact between the first brake disc 72 and at least one of, preferably both, the brake pads 76, 78 but wherein the first brake disc 72 nevertheless is allowed to rotate relative to the brake pads 76, 78.

In a similar vein as for the first locking mechanism 64, in the FIG. 4 implementation, the second locking mechanism 66 comprises a second brake disc 84 and a second brake caliper 86. The second brake caliper 86 includes a second caliper body 89 that holds two brake pads 88, 90 located on opposite sides of the second brake disc 84. A second piston 87 is positioned within the second caliper body 89. The second piston 87 is biased in a direction towards the second brake disc 84 by means of the second biasing member 70 to thereby bias the brake pad 90 towards the second brake disc 84. Purely by way of example, in order to apply a braking torque to the second brake disc 84, the second brake caliper 86 may be fixedly connected to the transmission housing 60 in at least the direction of the needed reaction force.

Moreover, the FIG. 4 implementation of the second brake caliper 86 is a so called floating caliper. As such, the FIG. 4 implementation of the second brake caliper 86 can move with respect to the second brake disc 84, along a line parallel to the axis of rotation of the second brake disc 84. As such, when the second biasing member 70 has pushed one of the brake pads 90, via the second piston 87, such that it makes contact with the second brake disc 84, the second caliper body 89 then slides and pulls the other brake pad 88 so that pressure is applied to both sides of the second brake disc 84.

However, it should be noted that other implementations are also envisaged. Purely by way of example, the implementations of the second locking mechanism 66 may comprise two biasing members (not shown), each one of which being adapted to bias an individual brake pad towards the second brake disc 84. As such, the second brake caliper 86 need not necessarily be a so called floating caliper.

The second brake caliper 86 is in turn connected to a second fluid source 92, for instance via a fluid conduit 94 as exemplified in FIG. 4. Purely by way of example, the second fluid source 92 may be a tank or a pump and the fluid may for instance be a gas, such as air, or a liquid, such as a hydraulic fluid, for instance hydraulic oil.

In the FIG. 4 implementation of the second locking mechanism 66, the second fluid source 92 is fluidly connected to a second fluid cavity 91 formed between the second piston 87 and the second caliper body 89. As such, a fluid pressure applied in the second fluid cavity 91 will impart a force onto the second piston 87 in a direction opposite to the force generated by the second biasing member 70, thus releasing the two brake pads 88, 90 from contact with the second brake disc 84.

Although the first 80 and second 92 fluid sources are illustrated as separate entities in FIG. 4, it is also envisaged that the embodiments of the transmission arrangement 38 may comprise a single fluid source feeding fluid to each one of the first 64 and second 66 locking mechanisms.

In the FIG. 4 implementation, the second brake caliper 86 controls the two brake pads 88, 90 such that when the second brake caliper 86 is fed with fluid having a fluid pressure from the fluid source 92, the second brake caliper 86 forces the two brake pads 88, 90 away from each other.

In the FIG. 4 implementation, the second biasing member 70 and the second fluid pressure applied in the second fluid cavity 91 interact such that for at least a second fluid pressure equal to zero overpressure, the second locking mechanism 66 is adapted to assume a locked condition in which the second ring gear 55 is locked to the transmission housing 60. In such a condition, the biasing force from the second biasing member 70 exceeds the force by which the second fluid pressure releases the two brake pads 88, 90 from contact with the second brake disc 84. It should also be noted that the second locking mechanism 66 may be adapted to assume the above-mentioned locked condition also when a second fluid pressure is greater than zero overpressure.

Furthermore, for a second fluid pressure equal to or higher than a second fluid pressure threshold, the second locking mechanism 66 is adapted to assume a released condition in which the second ring gear 55 is free to rotate relative to the transmission housing 60. In such a condition, the biasing force from the second biasing member 70 does not exceed the force by which the second fluid pressure releases the two brake pads 88, 90 from contact with the second brake disc 84 such that there is no contact between the second brake disc 84 and any one of the brake pads 88, 90.

Still further, for at least one second intermediate pressure between zero overpressure and the second fluid pressure threshold, the second locking mechanism 66 is adapted to assume a slipping condition in which a relative rotation is allowed but braking torque is applied between the transmission housing 60 and the second ring gear 55. In a slipping condition, there is contact between the second brake disc 84 and at least one of, preferably both, the brake pads 88, 90 but wherein the second brake disc 84 nevertheless is allowed to rotate relative to the brake pads 88, 90.

Moreover, again with reference to FIGS. 3A-3B, in embodiments of the transmission arrangement 38, the transmission housing 60 may comprise a transmission housing wall assembly 96 defining a transmission housing cavity 98 enclosing at least the first 102 and second 104 planetary gear sets. Moreover, as indicated in FIGS. 3A-3B, in embodiments of the transmission arrangement 38, at least an external portion of each one of the first 64 and second 66 locking mechanisms is located on one side of the transmission housing wall assembly 96 and the transmission housing cavity 98 is located on an opposite side of the transmission housing wall assembly.

Purely by way of example, and as indicated in FIG. 4, the external portion of the first locking mechanism 64 may comprise the first brake disc 72 and the first brake caliper 74 and the external portion of the second locking mechanism 66 may comprise the second brake disc 84 and the second brake caliper 86.

Moreover, the transmission housing cavity 98 may contain a transmission lubrication liquid (not shown in FIGS. 3A-3B), wherein at least the external portion of each one of the first and second locking mechanisms 64, 66 is adapted not to be in contact with the transmission lubrication liquid.

By means of the above description, the gear selection arrangement 62 can assume a first gear condition in which the first locking mechanism 64 assumes the locked condition and in which the second locking mechanism 66 assumes one of a set of second locking mechanism non-locked conditions. As such, in the first gear condition, the first ring gear 45 is locked to the transmission housing 60. Thus, in the first gear condition, power is transferred via the first sun gear 48 to the first planet carrier 50 and thereafter to the output shaft 42.

As a non-limiting example, the set of second locking mechanism non-locked conditions comprises the released condition of the second locking mechanism 66 when the gear selection arrangement 62 assumes the first gear condition.

As another non-limiting example, the second locking mechanism 66 may, when the gear selection arrangement 62 assumes the first gear condition, be adapted to assume a slipping condition in which a relative rotation is allowed but braking torque is applied between the transmission housing 60 and second ring gear 55. The set of second locking mechanism non-locked conditions comprises the slipping condition of the second locking mechanism 66.

The gear selection arrangement 62 can also assume a second gear condition in which the second locking mechanism 66 assumes the locked condition and in which the first locking mechanism 64 assumes one of a set of first locking mechanism non-locked conditions. As such, in the second gear condition, the second ring gear 55 is locked to the transmission housing 60. Thus, and with reference to the exemplified embodiment depicted in FIG. 3A, in the second gear condition, the second ring gear 55 is prevented from rotating relative to the transmission housing, as a consequence of which power is transferred from the second planet carrier 56 to the first ring gear 45, which rotates the first planet carrier 50 and in turn transfer power to the output shaft 42.

As a non-limiting example, the set of first locking mechanism non-locked conditions comprises the released condition of the first locking mechanism 64 when the gear selection arrangement 62 assumes the second gear condition.

As another non-limiting example, again with reference to the exemplified embodiment of FIG. 3A, the first locking mechanism 64 may, when the gear selection arrangement 62 assumes the second gear condition, be adapted to assume a slipping condition in which a relative rotation is allowed but braking torque is applied between the transmission housing 60 and the first ring gear 45 as well as the second planet carrier 56. The set of first locking mechanism non-locked conditions comprises the slipping condition of the first locking mechanism 64.

Furthermore, and as indicated above, the gear selection arrangement 62 may be adapted to assume a locked condition in which the first locking mechanism 64 assumes the locked condition and the second locking mechanism 66 assumes the locked condition. In the locked condition, the transmission arrangement 38 will prevent the output shaft 42 from rotating. As such, the locked condition may be used for preventing the set of ground engaging members 160, 160' connected to the output shaft 42 from rotating, such that the transmission arrangement 38 then acts as a parking brake.

Moreover, in embodiments of the transmission arrangement 38 in which the second locking mechanism 66 is adapted to assume a slipping condition, the gear selection arrangement 62 may assume the first gear condition and the second locking mechanism 66 may be used for braking the set of ground engaging members 160, 160' when the vehicle is still moving by applying an actuating force to the second locking mechanism 66.

In a similar vein, in embodiments of the transmission arrangement 38 in which the first locking mechanism 64 is adapted to assume a slipping condition, the gear selection arrangement 62 may assume the second gear condition and the first locking mechanism 64 may be used for braking the set of ground engaging members 160, 160' when the vehicle is still moving by applying an actuating force to the first locking mechanism 64.

Still further, the input shaft 40 may be adapted to rotate around an axis of rotation direction. As seen in the axis of rotation direction, the electric motor 36 is located on the opposite side of the first 102 and second 104 planetary gear sets as compared to the first 64 and second 66 locking mechanisms.

It is to be understood that the present invention is not limited to the embodiments described above and illustrated in the drawings; rather, the skilled person will recognize that many changes and modifications may be made within the scope of the appended claims. For example, even though FIG. 4 has primarily been exemplified with reference to FIG. 3A, it should be understood that the various gear conditions assumed by the first and second locking mechanisms are also applicable for the transmission arrangement depicted in FIG. 3B.

The invention claimed is:

1. A transmission arrangement, comprising
   a first planetary gear set comprising a first set of planetary members, the first set of planetary members comprising a first sun gear, a first ring gear and a first planet carrier carrying a first set of planet gears, the first set of planet gears being in meshing engagement with the first ring gear and the first sun gear,
   a second planetary gear set comprising a second set of planetary members, the second set of planetary members comprising a second sun gear, a second ring gear and a second planet carrier carrying a second set of planet gears, the second set of planet gears being in meshing engagement with the second ring gear and the second sun gear, wherein a first member of the first set of planetary members is operatively connected to a first member of the second set of planetary members, and wherein a second member of the first set of planetary members is operatively connected to a second member of the second set of planetary members,
   a transmission housing,
   an input shaft connectable to a prime mover, the input shaft being operatively connected to the first sun gear,
   an output shaft operatively connected to the first planet carrier, and
   a gear selection arrangement comprising:
   a first locking mechanism connected to one of the members of the first set of planetary members, the first locking mechanism being adapted to be controlled by a first fluid pressure conducted to the first locking mechanism such that:
   for at least a first fluid pressure equal to zero overpressure, the first locking mechanism is adapted to assume a locked condition in which the one member of the first set of planetary members is locked to the transmission housing, and
   a second locking mechanism connected to one of the members of the second set of planetary members, the second locking mechanism being adapted to be controlled by a second fluid pressure conducted to the second locking mechanism such that:
   for at least a second fluid pressure equal to zero overpressure, the second locking mechanism is adapted to assume a locked condition in which the one member of the second set of planetary members is locked to the transmission housing,
   wherein the transmission housing comprises a transmission housing wall assembly defining a transmission housing cavity enclosing at least the first and second planetary gear sets, wherein at least an external portion of each one of the first and second locking mechanisms is located on one side of the transmission housing wall assembly and the transmission housing cavity is located on an opposite side of the transmission housing wall assembly.

2. The transmission arrangement according to claim 1, wherein the first locking mechanism is further adapted to assume a set of first locking mechanism non-locked conditions in which the one member of the first set of planetary members is allowed to rotate relative to the transmission housing, and wherein the second locking mechanism is further adapted to assume a set of second locking mechanism non-locked conditions in which the one member of the second set of planetary members is allowed to rotate relative to the transmission housing, whereby:

for a first fluid pressure equal to or higher than a first fluid pressure threshold, the first locking mechanism is adapted to assume a released condition in which the one member of the first set of planetary members is free to rotate relative to the transmission housing, the released condition forming part of the set of first locking mechanism non-locked conditions, for at least one first intermediate pressure between zero overpressure and the first fluid pressure threshold, the first locking mechanism is adapted to assume a slipping condition in which a relative rotation is allowed but braking torque is applied between the transmission housing and the one member of the first set of planetary members, the slipping condition forming part of the set of first locking mechanism non-locked conditions, for a second fluid pressure equal to or higher than a second fluid pressure threshold, the second locking mechanism is adapted to assume a released condition in which the one member of the second set of planetary members is free to rotate relative to the transmission housing, the released condition forming part of the set of second locking mechanism non-locked conditions, and for at least one second intermediate pressure between zero overpressure and the second fluid pressure threshold, the second locking mechanism is adapted to assume a slipping condition in which a relative rotation is allowed but braking torque is applied between the transmission housing and the one member of the second set of planetary members, the slipping condition forming part of the set of second locking mechanism non-locked conditions.

3. The transmission arrangement according to claim 2, wherein the gear selection arrangement is adapted to assume a first gear condition in which the first locking mechanism assumes the locked condition and in which the second locking mechanism assumes one of the set of second locking mechanism non-locked conditions.

4. The transmission arrangement according to claim 3, wherein the second locking mechanism assumes the slipping condition in the first gear condition.

5. The transmission arrangement according to claim 2, wherein the gear selection arrangement is adapted to assume a second gear condition in which the second locking mechanism assumes the locked condition and in which the first locking mechanism assumes one of the set of first locking mechanism non-locked conditions.

6. The transmission arrangement according to claim 5, wherein the first locking mechanism assumes the slipping condition in the second gear condition.

7. The transmission arrangement according to claim 1, wherein the gear selection arrangement is adapted to assume a locked condition in which the first locking mechanism assumes the locked condition and the second locking mechanism assumes the locked condition.

8. The transmission arrangement according to claim 1, wherein the first locking mechanism comprises a first biasing member, preferably a first spring arrangement, adapted to bias the first locking mechanism so as to assume the locked condition and wherein the second locking mechanism comprises a second biasing member, preferably a second spring arrangement, adapted to bias the second locking mechanism so as to assume the locked condition.

9. The transmission arrangement according to claim 1, wherein the first locking mechanism comprises a first brake disc and a first brake caliper and wherein the second locking mechanism comprises a second brake disc and a second brake caliper.

10. The transmission arrangement according to claim 9, wherein the external portion of the first locking mechanism comprises the first brake disc and the first brake caliper and wherein the external portion of the second locking mechanism comprises the second brake disc and the second brake caliper.

11. The transmission arrangement according to claim 1, wherein the transmission housing cavity comprises a transmission lubrication liquid, wherein at least the external portion of each one of the first and second locking mechanisms is adapted to be in non-contact with the transmission lubrication liquid.

12. The transmission arrangement according to claim 1, wherein the first locking mechanism is connected to the first ring gear.

13. The transmission arrangement according to claim 1, wherein the second locking mechanism is connected to the second ring gear.

14. The transmission arrangement according to claim 1, wherein the first ring gear is operatively connected to the second planet carrier.

15. A working machine comprising a transmission arrangement according to claim 1, and a prime mover connected to the input shaft of the transmission arrangement.

* * * * *